(12) United States Patent
Hansen

(10) Patent No.: US 7,702,558 B1
(45) Date of Patent: Apr. 20, 2010

(54) INVESTMENT STRATEGIES UTILIZING PRINCIPAL PROTECTION OF INVESTMENTS

(75) Inventor: Matthew Hansen, NY, NY (US)

(73) Assignee: Morgan Stanley, NY, NY (US)

(*) Notice: Subject to any disclaimer, the term of this patent is extended or adjusted under 35 U.S.C. 154(b) by 1333 days.

(21) Appl. No.: 11/027,171

(22) Filed: Dec. 30, 2004

(51) Int. Cl.
G06Q 40/00 (2006.01)
(52) U.S. Cl. .................................. 705/36 R; 705/37
(58) Field of Classification Search .......... 705/36 R–37
See application file for complete search history.

(56) References Cited

U.S. PATENT DOCUMENTS

| 6,360,210 | B1 | 3/2002 | Wallman |
| 2004/0138927 | A1* | 7/2004 | Eydeland et al. ............... 705/4 |
| 2004/0177022 | A1* | 9/2004 | Williams et al. .............. 705/36 |
| 2006/0200400 | A1* | 9/2006 | Hunter et al. ............. 705/36 R |

OTHER PUBLICATIONS

Hayne E. Leyland and Mark Rubinstein, "The Evolution of Portfolio Insurance," published in *Dynamic Hedging: A Guide to Portfolio Insurance*, 1988, John Wiley and Sons, 7 pages.

* cited by examiner

*Primary Examiner*—Thu Thao Havan
(74) *Attorney, Agent, or Firm*—K&L Gates LLP

(57) ABSTRACT

An investment method includes establishing an arrangement between an investor and a derivative counterparty in association with at least one portfolio having a plurality of investments. The method further includes setting at least one value for the portfolio including at least a minimum protection value; setting one or more interim settlement periods based on a maturity date of the arrangement including the portfolio; setting a cap level for the portfolio based on at least the minimum protection value of the portfolio; and, resetting at least one of the values or characteristics of the portfolio in association with performance of the portfolio during at least one of the interim settlement periods.

25 Claims, 4 Drawing Sheets

INVESTMENT STRATEGIES UTILIZING PRINCIPAL PROTECTION OF INVESTMENTS

BACKGROUND

At various times in certain financial environments, interest rates may be at levels that do not produce sufficient or desirable yield for investors holding investments affected by interest rate levels. Alternative options for investments, such as holding equity related investments, for example, may not be viable or attractive for investors because the risks associated with such equity related investments may not be acceptable in view of the investment objectives of the investor. In addition, tax considerations for investments closely connected with interest rate levels may be implicated by existing policies, regulations, rules and/or laws that address taxation of income, for example, derived from such investments.

In financial environments where returns on investments affected by interest rates may be relatively low, investors may seek an alternative form of principal-protected investment that provides the opportunity for adequate yield while maintaining a risk profile that is acceptable to the investor. One example of an alternative strategy may involve an equity-linked note (among other types of investment instruments that may be characterized as contingent payment debt instruments for purposes of applicable policies, rules, regulations, and/or laws governing tax treatment of such investment instruments) that is structured to pay the note holder appreciation associated with an equity market or index (e.g., S&P 500) with which the note is connected or linked. One disadvantage of the equity-linked instrument is that the note holder is generally required to accrue taxable income (e.g., original issue discount or "OID") during the life of the note based on an assumed yield, even though the holder may not receive any coupon payment on the note prior to maturity of the instrument. Another disadvantage is that equity-linked notes are usually connected to an index or a fixed portfolio; this link does not offer the opportunity for enhanced returns that can be derived from a more dynamically or actively managed portfolio. Still another disadvantage is that an equity-linked note is typically structured to settle on a specific maturity date on which the holder receives a coupon in one lump sum that may be considered ordinary income to the holder (i.e., versus more desirable long-term capital gains treatment for the income, for example). In addition, the option to defer the coupon income received on the maturity date of the note may not be available.

Another conventional investment strategy involves maintaining a portfolio of investments such as large capitalization stocks, for example, and also employing one or more derivative arrangements (e.g., options) to hedge risk on the portfolio. In one example scenario, an investor (1) establishes a portfolio with an account manager for active management of various stock investments for the investor; and (2) purchases a put option associated with the S&P 500 index. In this arrangement, the investor is provided with the benefits of active management of the stock portfolio by the account manager, and the put option on the S&P 500 index is employed to hedge quote-on-quote market risk. A primary disadvantage to this investment strategy, however, is that there may be a relatively large and undesirable disparity between performance of the stock portfolio under active management by the account manager and performance of the hedge arrangement associated with the put option. From the perspective of the financial objectives of the investor, this strategy may introduce an unacceptable degree of risk of loss of principal assets.

It can be seen, therefore, that many conventional investment strategies and financial products do not provide the potential for adequate yield on investments in conjunction with minimizing risk to principal assets.

SUMMARY

The present invention provides various embodiments of an investment method. In certain embodiments, the method may include establishing an arrangement between an investor and a derivative counterparty in association with at least one portfolio having a plurality of investments; setting at least one value for the portfolio including at least a minimum protection value; setting one or more interim settlement periods based on a maturity date of the arrangement between the parties; setting a cap level for the portfolio based on at least the minimum protection value of the portfolio; and, resetting at least one of the values or characteristics of the portfolio in association with its performance during at least one of the interim settlement periods.

In certain aspects, the invention may include managing the portfolio with a management entity, which may be a collateral management entity employing a collateral account or a portfolio management entity. The arrangement between the investor and the derivative counterparty may include at least one hedge arrangement that may involve one or more derivative transactions.

In practice, methods provided in accordance with the present invention may use a determinant to determine a cap level for the portfolio. Values of the portfolio may be adjusted in response to performance of the portfolio above or below the determined cap level. Settlement payments may be made to the investor or the derivative counterparty based on performance of the portfolio above or below the cap level during one or more interim settlement periods. In addition, the cap level for the portfolio may be adjusted periodically as a function of performance of the portfolio during one or more of the interim settlement periods.

In addition, embodiments of the present invention may be executed with, without, or partly with the assistance of a computer or computer system. System and computer-readable media embodiments of the invention are also described herein.

DESCRIPTION

Figure 1:
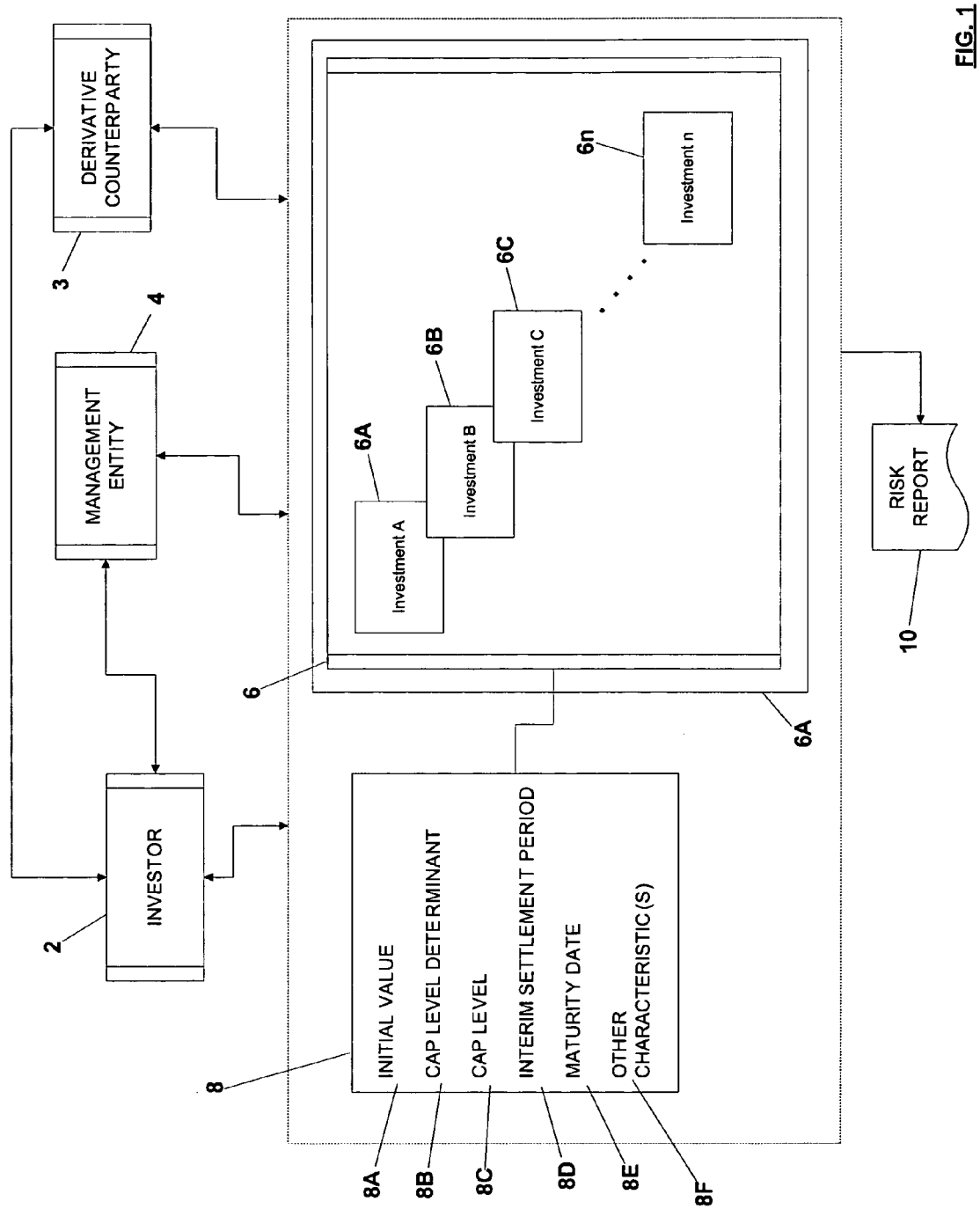
FIG. 1 includes a schematic representation of an investment structured in accordance with various embodiments of the present invention.

As employed herein, an "investor" may include any financial entity, institutional entity, and/or individual entity capable of managing, transacting, maintaining and/or performing one or more financial or investment functions in association with practice of various aspects of the present embodiments. It can be appreciated that the term "investor" can include financial/institutional entities such as, for example and without limitation, hedge funds, mutual funds, family offices, separately managed accounts, limited partnerships, trusts, and/or other entities, institutions and/or accounts which can be structured for application to various aspects of the present invention. As employed herein, a "management entity" may include any financial entity or institutional entity capable of managing, transacting, maintaining and/or performing investment related functions in association with a portfolio or collateral account of an investor. Examples of management entities that can be applied in accordance with various aspects of the present embodiments include, without limitation, mutual funds, family offices, separately managed accounts, limited partnerships, trusts, hedge funds, and/or any other entities, institutions and/or accounts that can be structured/configured for suitable application to various embodiments the present invention. In various aspects, a management entity may possess one or more short positions and/or one or more long positions with respect to one or more investment portfolios or collateral accounts managed by the management entity. The management entity may be structured to employ one or more investment strategies that involve one or more transactions including, for example and without limitation, selling short, leverage, program trading, swaps, arbitrage, and/or derivative transactions. Two kinds of management entities that may be applied to the present invention include a collateral management entity or a portfolio management entity.

The term "actively managed" as applied herein with respect to management of a portfolio or collateral account means that at least one characteristic of the portfolio or collateral account is subject to change at the discretion of a management entity managing the portfolio or collateral account. Examples of characteristics for actively managed portfolios may include, for example and without limitation, a number of different types of securities in the portfolio or collateral account, a total market capitalization of investments in the portfolio or assets in the collateral account, a number of different market or industry sectors represented in the portfolio or collateral account, a sector concentration percentage or percentages for investments in the portfolio or assets comprising the collateral account, a number and value of cash investments in the portfolio or collateral account, and/or other like characteristics.

The term "passively managed" as applied herein with respect to management of a portfolio or collateral account, means that at least one characteristic of the portfolio or collateral account is subject to change without a degree of discretion or with a degree of discretion comparatively substantially less than that of the discretion exercised in an actively managed portfolio (see above-definition of "actively managed"). Examples of characteristics for passively managed portfolios may include, for example and without limitation, a number of different types of securities in the portfolio, a total market capitalization of investments in the portfolio or assets in the collateral account, a number of different market or industry sectors represented in the portfolio or collateral account, a sector concentration percentage or percentages for investments in the portfolio or assets comprising the collateral account, a number and value of cash investments in the portfolio or collateral account, and/or other like characteristics.

Figure 2:
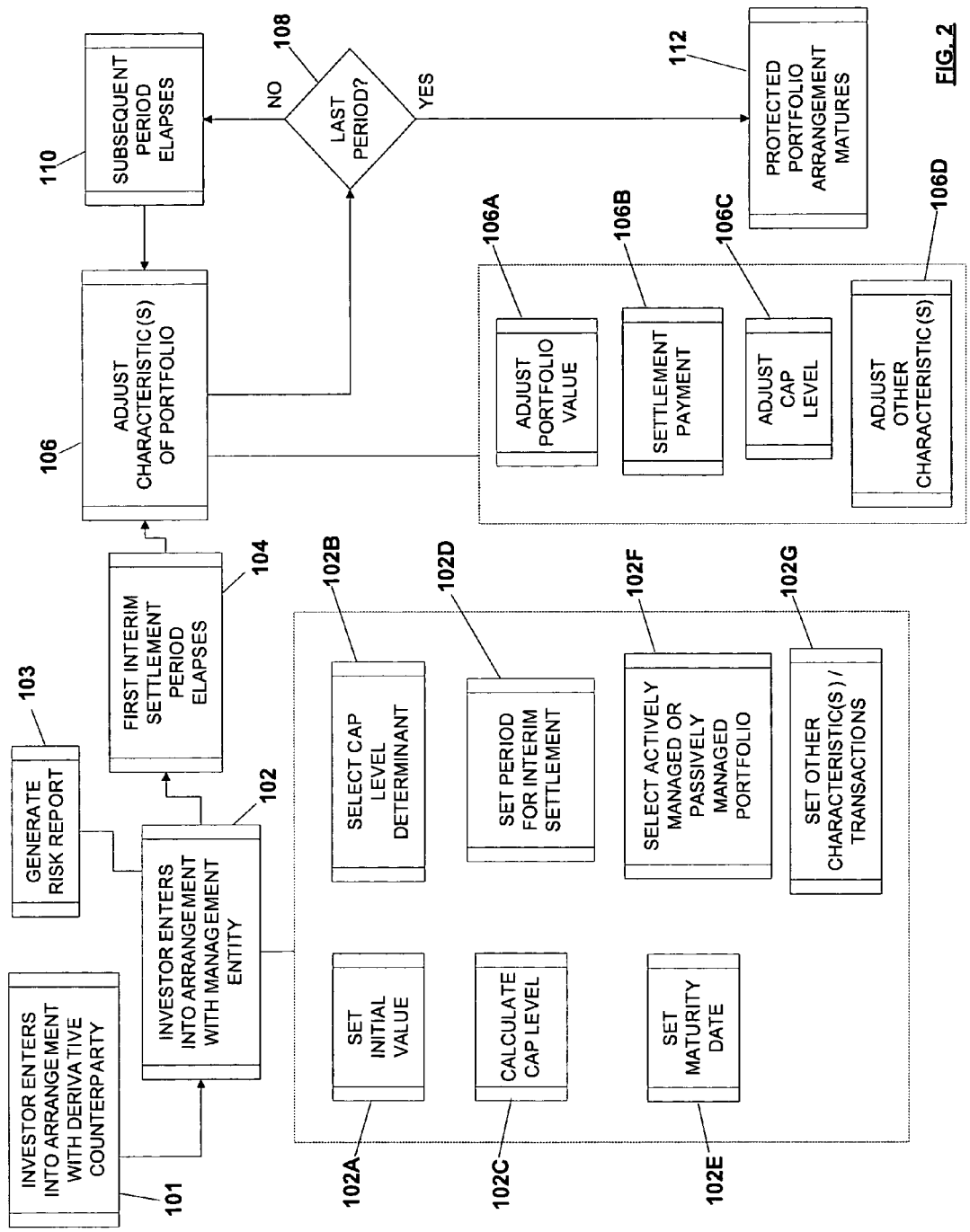
FIG. 2 includes a process flow diagram of an investment method provided in accordance with various embodiments of the present invention.

Referring now to FIGS. 1 and 2, various embodiments of an investment method provided in accordance with the present invention are illustrated. In step 101, an investor 2 enters into an arrangement with a derivative counterparty 3 wherein the derivative counterparty 3 will, if the value of a portfolio 6 of securities selected by the investor 2 decreases over the life of the arrangement, pay to the investor 2 a certain minimum amount to the investor 2 upon a predetermined maturity date 8E. In this arrangement, the investor 2 may agree that, if the value of the portfolio 6 increases over the life of the arrangement, then the derivative counterparty 3 will not have to pay more than a certain cap level 8C upon the maturity date 8E of the arrangement and/or any interim settlement periods 8D to which the parties 2, 3 may agree. The investor 2 may secure its arrangement with the derivative counterparty 3 by pledging into a collateral account 6A held by the derivative counterparty 3 the portfolio 6 of securities. The investor 2 may have the right over the life of the arrangement, subject to parameters predetermined by the parties 2, 3, to substitute one or more securities pledged in the collateral account 6A with one or more other securities of equal value. As part of the arrangement, the investor 2 may agree to notify the derivative counterparty 3 when it exercises such substitution rights.

In step 102, the investor 2 enters into an arrangement with a management entity 4, which in certain embodiments may be a collateral management entity. The management entity 4 establishes and manages, such as by exercising the investor's 2 substitution rights described above, the portfolio 6 of investments including, for example, investments 6A, 6B and 6C (wherein up to "Investment n" (6n) may be included in the portfolio 6), for the investor 2. The investments in the portfolio 6 may be pledged to the derivative counterparty 3 in the collateral account 6A (as described above). In various aspects, the number of different types of investments 6A, 6B, 6C, 6n, can be in the range of about 25 to 80 different entities, in one example aspect, and in the range of about 35 to 45 different entities, in another example aspect. In one aspect, the investor 2 enters into a contractual arrangement with the management entity 4 to create and manage the portfolio 6 with multiple investments including, for example and without limitation, one or more stock investments. In one example situation, the investor 2 seeks to obtain financial exposure to a selected portfolio 6 and desires protection for a minimum level of value of the portfolio 6. In return for these benefits, the investor 2 is willing to enter into the arrangement with the derivative counterparty 3 to forego a certain level of participation in the performance of the portfolio 6 to the extent that the value of the portfolio 6 appreciates above the predetermined cap level 8C for the portfolio 6.

Also, in step 102, one or more characteristics 8 may be set for the portfolio 6 comprising the collateral account 6A. In step 102A, an initial value 8A may be established for the portfolio 6 comprising the collateral account 6A. In various embodiments, the initial value 8A may also be considered a minimum protection value for the portfolio 6 comprising the collateral account 6A due to the existence of one or more hedging transactions entered into by the investor 2 with the derivative counterparty 3. Despite performance over time of the portfolio 6 comprising the collateral account 6A, the value of the portfolio 6 comprising the collateral account 6A may be structured to be never less than the minimum protection value. In one illustrative example, the initial value 8A is at least about $10MM for the portfolio 6 comprising the collateral account 6A.

In step 102B, a cap level determinant 8B is selected for use in determining the initial cap level 8C and/or other cap levels 8C for one or more interim values of the portfolio 6 comprising the collateral account 6A. In one example aspect, the cap level determinant 8B represents a fixed percentage of the current value of the portfolio 6 comprising the collateral account 6A for determining a cap level 8C above which the investor 2 is not entitled to the performance of the portfolio 6 comprising the collateral account 6A. In other aspects of the invention, the cap level determinant 8B may be, for example and without limitation, a fixed dollar amount above the initial value 8A, a percentage based on a running average of a historical performance factor of the portfolio 6 comprising the collateral account 6A, an ascending percentage based on occurrence of one or more interim settlement periods during the life of the portfolio 6 comprising the collateral account 6A, a declining percentage based on occurrence of one or more interim settlement periods during the life of the portfolio 6 comprising the collateral account 6A, and/or myriad other determinants for calculating a cap level 8C for the portfolio 6 comprising the collateral account 6A. In various aspects, the cap level determinant 8B may be selected based on the length of the hedge arrangement with the derivative counterparty 3 (e.g., one-year period, three-year period, five-year period, seven-year period, ten-year period, and other suitable periods until maturity of the hedge arrangement), whether the collateral account 6A is actively or passively managed, and/or a variety of other potential factors. In certain aspects, if the cap level determinant 8B is a fixed percentage, for example, values for the fixed percentage may be in the range of about 5% to 10%.

In certain embodiments of the present invention, the management entity 4 may be a portfolio management entity that establishes and manages the portfolio 6 of investments for the investor 2. The investor 2 may enter into one or more hedging transactions based on the portfolio 6 with the derivative counterparty 3 in accordance with step 101 (see above). The structure and function of the portfolio management entity in managing the portfolio 6 are substantially identical to management of a portfolio comprising the collateral account 6A described above, including the functions performed in connection with step 102, for example. In addition, the securities that comprise the portfolio 6 managed by the portfolio management entity may be pledged to the derivative counterparty 3 to secure obligations of the investor 2 under one or more hedging transactions arranged between the parties 2, 3.

The description of embodiments of the present invention that follow may apply to use of either a collateral management entity or a portfolio management entity as the management entity 4. In the following description, the term "portfolio" may mean either: (1) a portfolio 6 that comprises the collateral account 6A managed by a collateral management entity; or (2) a portfolio 6 managed by a portfolio management entity. Also, where applicable, the term "management entity" may mean either a collateral management entity or a portfolio management entity.

In step 102C, the initial cap level 8C can be calculated based on the particular cap level determinant 8B selected in step 102B. In step 102D, the interim settlement period 8D for conducting one or more interim settlement transactions can be selected based on, among other factors, the maturity date 8E of the portfolio 6, which can be set in step 102E. The interim settlement period 8D can be structured/configured as any period of time suitable for application to various embodiments of the invention. Examples of the interim settlement period 8D include, without limitation, one or more of the following periods, alone or in combination: daily, weekly, monthly, quarterly, and/or yearly.

In step 102F, the investor 2 can determine whether the portfolio 6 should be configured to be an actively managed portfolio or a passively managed portfolio. In one example of an actively managed portfolio, an employee of the management entity 4 is operatively associated with the portfolio 6 to select a variety of different S&P 500 stocks, for example, subject to certain predetermined parameters or guidelines associated with actively managing the portfolio 6. In one example of a passively managed portfolio, the investor 2 chooses a market index (e.g., S&P 500) or exchange-traded funds on which investment decisions for the principal value or initial value 8A of the portfolio 6 are indirectly based.

In certain embodiments of the present invention, one or more other, additional characteristics 8F of the portfolio 6 can be structured/configured, and/or additional transactions performed, in step 102G. It can be seen that, in various aspects of the present invention, one or more other transactions such as hedge transactions including one or more derivative arrangements, for example, may be performed in association with the portfolio 6. Embodiments of the present invention may have the effect of granting a put option to the investor 2 on a portfolio 6 that dynamically changes and granting a call option to the derivative counterparty 3. In one aspect, the investment structure may include a put option for the investor 2 for a period of five years and a series of three-month or quarterly call options arranged by the management entity 4 such as with the derivative counterparty 3.

It can be appreciated, however, that myriad other potential configurations can be employed within the scope of the present invention. In another example aspect, the investor 2 can be sold a five-year put to protect the minimum value of the portfolio 6, and the management entity 4 arranges for sale of a single five-year call whereby the investor 2 surrenders any appreciation in the portfolio 6 above the designated cap level 8C. In still another aspect, the investor 2 purchases an insurance policy to protect a minimum value of the portfolio 6, and the investor 2 retains the opportunity to realize any appreciation on the value of the portfolio 6. It can be appreciated that multiple configurations are possible in which an option or other derivative, an insurance policy, and/or another functionally similar arrangement may be operatively associated with the portfolio 6 of investments.

In other aspects of the present embodiments, additional other characteristics 8F such as investment criteria or guidelines, for example, may be provided for the portfolio 6. In one example aspect, turnover of investments, for example, can be limited to a range of about 30% to 50% for a given time period (e.g., per annum). Turnover can be defined as the volume of kinds of investments (e.g., names of stocks), expressed as a percentage of the total of investments included in the portfolio 6, that are bought or sold during a given time period. In another example aspect, dividends may or may not be reinvested in the portfolio 6 and/or may or may not be linked to the total performance of the portfolio 6 for purposes of determining cap level 8C calculations, for example. In another example aspect, a single position concentration can be set in the range of about 5% to 10% to limit the inclusion of an excessive amount of any single type of investment (e.g., a single stock name) in the portfolio 6. Various industry sector criteria can also be factored into establishing the portfolio 6: maximum sector concentration (expressed as a percentage on a per-sector basis), minimum sector concentration (expressed as a percentage on a per-sector basis), and/or minimum number of sectors held can be adjusted in accordance with performance of the portfolio 6. In one example aspect, sector concentration can vary in the range of less than about 25% for one sector included within the portfolio 6. In another example aspect, the number of sectors held can include a number of sectors defined by a market index such as the S&P 500 index, for example. In another example aspect, the maximum cash position to be held within the portfolio 6 can be set in the range of no more than about 5% of the total value of the portfolio 6. It can be appreciated that a variety of policies, rules, regulations and/or laws may dictate one or more of the characteristics 8 of the portfolio 6. For example, policies, rules, regulations and/or laws applicable to hedging investments and/or taxation of income derived from investments may be considered during the process of selecting characteristics 8 for the portfolio 6.

In various embodiments of the invention, in step 103 a risk report 10 can be generated for the portfolio 6 from time to time during the arrangement between the investor 2 and the derivative counterparty 3. The risk report 10 may be issued on a suitably periodic basis (e.g., daily) and may include information associated with the aforementioned characteristics 8 of the portfolio 6. The risk report 10 can identify alerts or exceptions, for example, where a given characteristic has exceeded a predetermined, acceptable percentage range or other value range. In one example scenario, the risk report 10 can indicate that a predetermined maximum level of concentration in an industry sector has been exceeded and one or more investments currently held in that sector in the portfolio 6 must be sold to restore the percentage concentration to a desired range. It can be appreciated that the risk report 10 can assist an account manager, for example, or another employee, with various portfolio 6 risk management activities and may enhance efficiency in executing the investment guidelines of the portfolio 6.

In step 104, the first interim settlement period elapses such as after a period of market trading involving the portfolio 6. Based on performance of the portfolio 6, which may include a change in value of the portfolio 6, one or more characteristics 8 of the portfolio 6 can be adjusted in step 106. In step 106A, for example, the portfolio 6 value may be adjusted to reflect appreciation above the initial value 8A of the portfolio 6 or above the cap level 8C, or to reflect depreciation below the minimum protection value 8A. In one aspect, assuming performance of the portfolio 6 is below the minimum protection value 8A of the portfolio 6, the value of the portfolio 6 is not adjusted below the minimum protection value 8A. In step 106B, one or more interim settlement payments may be made. Interim settlement payments are the amounts, if any, by which the portfolio 6 value on the relevant interim settlement date exceeds the current portfolio 6 cap level 8C which may have been calculated based on activity occurring in one or more preceding interim settlement periods 8D. In step 106C, on the interim settlement date, the cap level 8C is reset to equal a price above the current value of the portfolio 6 subject to application of the cap level determinant 8B in the current interim settlement period after taking into account any relevant interim settlement payments. In step 106D, one or more other characteristics 8 of the portfolio 6 may be adjusted as a consequence of market activity that occurs in a current interim settlement period 8D and/or one or more preceding interim settlement periods 8D.

In step 108, a determination is made whether or not the most recently elapsed interim settlement period 8D was the last period for the portfolio 6 in view of the maturity date 8E for the portfolio 6. If the most recently elapsed interim settlement period 8D is not the last period, then a subsequent period 8D proceeds and elapses in step 110, with the process continuing in step 106 (as described above). If the most recently elapsed interim settlement period 8D is the last period, then the arrangement of the investor 2 with the derivative counterparty 3 matures on the maturity date 8E in step 112. In one example aspect, after maturity of a hedge arrangement on the investments 6A, 6B, 6C, 6n in the portfolio 6, a benefit may be realized by the investor 2 by holding the investments 6A, 6B, 6C, 6n for a period of time after the hedge arrangement has matured/expired. This holding period may provide preferential long-term capital gains tax treatment to the investor 2 for the held investments 6A, 6B, 6C, 6n, for example, instead of less favorable ordinary income tax treatment.

Figure 3:
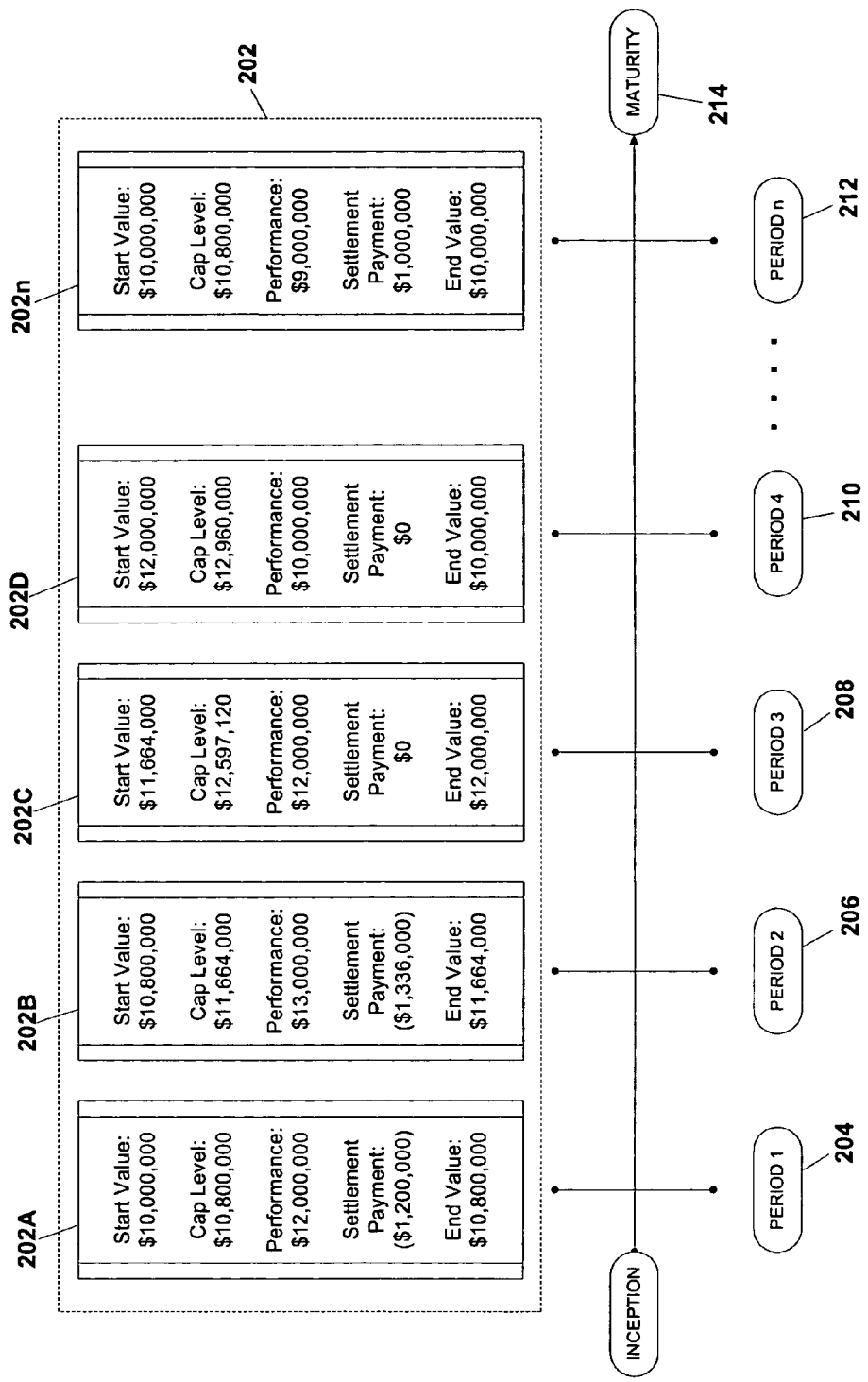
FIG. 3 includes a schematic diagram illustrating various aspects of an operational investment example provided in accordance with the present invention; and, FIG. 4 includes a schematic diagram illustrating various system embodiments provided in accordance with the present invention.

Referring now to FIG. 3, an operational example of the practice of various aspects of the present embodiments is provided. A portfolio 202 of investments is shown at various stages 202A, 202B, 202C, 202D, up to 202n, wherein "n" is the number of interim settlement periods occurring during the life of a hedge arrangement between the investor 2 and the derivative counterparty 3, as arranged by the management entity 4 in association with the portfolio 202. At stage 202A, in association with market activity occurring during interim settlement period 204, the start value of the portfolio is $10,000,000; the cap level is $10,800,000 (based on a fixed percentage cap level determinant 8B of 8% of the start value of the portfolio 202 in stage 202A); and, the value of the portfolio 202 based on its performance during the interim settlement period 204 is $12,000,000. This results in an interim settlement payment made by the investor 2 to the derivative counterparty 3 of $1,200,000 (i.e., to the extent that performance of the portfolio 202 exceeded the cap level). The value of the portfolio 202 is then reset to $10,800,000.

At stage 202B, in association with market activity occurring during interim settlement period 206, the start value of the portfolio 202 is $10,800,000 (which, in this example, is based on the end value determined for the portfolio 202 in stage 202A); the cap level is $11,664,000 (based on a fixed percentage cap level determinant of 8% of the start value of the portfolio 202 in stage 202B); and, the value of the portfolio 202 based on its performance during the interim settlement period 206 is $13,000,000. This results in an interim settlement payment made by the investor 2 to the derivative counterparty 3 of $1,336,000 (i.e., to the extent that performance of the portfolio 202 exceeded the cap level). The value of the portfolio 202 is then reset to $11,664,000.

At stage 202C, in association with market activity occurring during interim settlement period 208, the start value of the portfolio 202 is $11,664,000 (which, in this example, is based on the end value determined for the portfolio 202 in stage 202B); the cap level is $12,597,120 (based on a fixed percentage cap level determinant of 8% of the start value of the portfolio 202 in stage 202C); and, the value of the portfolio 202 based on its performance during the interim settlement period 208 is $12,000,000. This results in no interim settlement payment made by the investor 2 to the derivative counterparty 3 (i.e., to the extent that performance of the portfolio 202 did not exceed the cap level). The value of the portfolio 202 remains at $12,000,000.

At stage 202D, in association with market activity occurring during interim settlement period 210, the start value of the portfolio 202 is $12,000,000 (which, in this example, is based on the end value determined for the portfolio 202 in stage 202C); the cap level is $12,960,000 (based on a fixed percentage cap level determinant of 8% of the start value of the portfolio 202 in stage 202D); and, the value of the portfolio 202 based on its performance during the interim settlement period 210 is $10,000,000. This results in no interim settlement payment made by the investor 2 to the derivative counterparty 3 (i.e., to the extent that performance of the portfolio 202 did not exceed the cap level but did not fall below the initial start value or minimum protection value of the portfolio 202). The value of the portfolio 202 remains at $10,000,000.

At stage 202n, in association with market activity occurring during interim settlement period n (212), the start value of the portfolio 202 is $10,000,000 (which, in this example, is based on the end value determined for the portfolio 202 in a prior stage); the cap level is $10,800,000 (based on a fixed percentage cap level determinant of 8% of the start value of the portfolio 202 in stage 202$n$); and, the value of the portfolio 202 based on its performance during the interim settlement period 212 is $9,000,000. This results in an interim settlement payment of $1,000,000 made by the derivative counterparty 3 to the investor 2 (i.e., to the extent that performance of the portfolio 202 fell below the initial start value or minimum protection value of the portfolio 202). The value of the portfolio 202 is then reset to an end value of $10,000,000. At a maturity date 214 of the portfolio 202, the end value of $10,000,000 determined in stage 202$n$ is realized by the investor 2 as the value of the portfolio 202.

In various aspects of the present embodiments, it can be seen that a minimum protection value for a portfolio may account for incurred management fees, commissions, and/or other costs or fees associated with active or passive management of the portfolio. The minimum protection value can be maintained despite the existence and/or application of these costs or fees to the portfolio.

Figure 4:
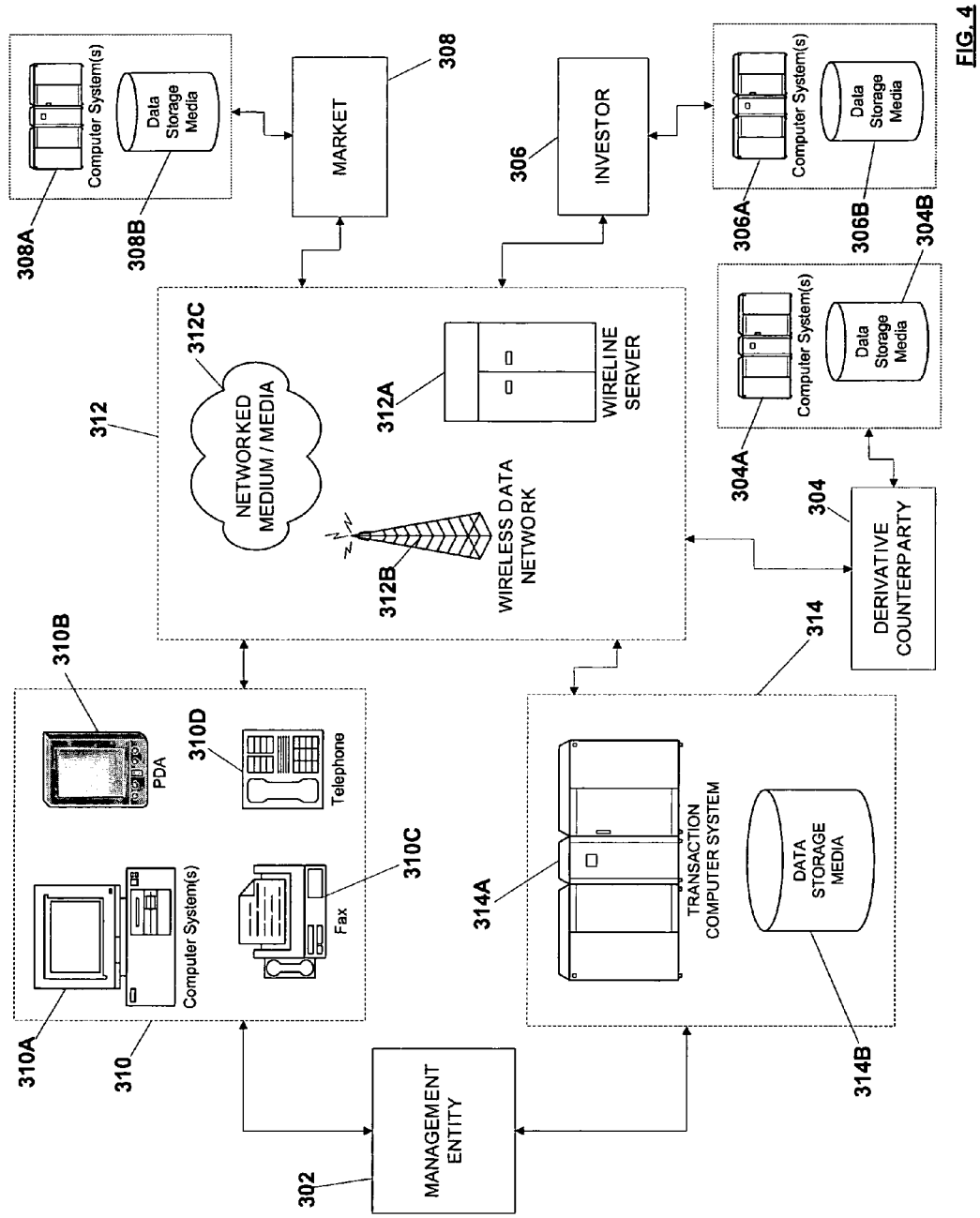

Referring now to FIG. 4, one illustrative system embodiment is provided in accordance with the practice of the present invention. As shown, a management entity 302 may communicate and/or exchange data with one or more of a derivative counterparty 304, an investor 306, and/or a market 308, such as a market for S&P 500 stocks, for example. In one aspect, the management entity 302 can be operatively associated with one or more communications devices 310 such as, for example and without limitation, a computer system 310A, a personal digital assistant 310B, a fax machine 310C, and/or a telephone 310D (e.g., a wireline telephone, a wireless telephone, a pager, and the like), and/or other like communication devices. The communication devices 310 permit the management entity 302, the derivative counterparty 304, the investor 306, and/or the market 308 to communicate between/among each other through one or more communication media 312, such as by use of electronic mail communication through one or more computer systems, for example. The communication media 312 can include, for example and without limitation, wireline communication means such as a wireline server 312A, a wireless data network 212B, and/or a connection through a networked medium or media 312C (e.g., the Internet, an extranet, an intranet, a wide area network (WAN), and/or a local area network (LAN)).

In addition, the management entity 302 (as well as any one or more of the derivative counterparty 304, the investor 306, and/or the market 308) may be operatively associated with one or more data processing/storage devices such as data processing/storage devices 314, for example. As illustrated in FIG. 4, the management entity 302 can be operatively associated with a transaction computer system 314A, for example, and/or one or more data storage media 314B that can receive, store, analyze and/or otherwise process data and other information in association with communications that occur between/among the management entity 302, the derivative counterparty 304, the investor 306, and/or the market 308. The transaction computer system 314A may be employed to generate one or more risk reports 10, for example (see above). In another aspect, the derivative counterparty 304 can be operatively associated with one or more computer systems 304A and/or one or more data storage media 304B. In another aspect, the investor 306 can be operatively associated with one or more computer systems 306A and/or one or more data storage media 306B.

In another aspect, the market 308 can be operatively associated with one or more computer systems 308A and/or one or more data storage media 308B. For example, data communication may be established with the market 308 to determine if settlement payments must be made to/from the investor 306 or the derivative counterparty 304, for example, or if adjustments to the characteristics 8 of the portfolio 6 are warranted. It can be appreciated that one or more of the computer systems 304A, 306A, 308A, 314A and one or more of the data storage media 304B, 306B, 308B, 314B may be employed to communicate, store, analyze, and/or otherwise process data related to financial transactions occurring between and/or among the management entity 302, the derivative counterparty 304, the investor 306, and/or the market 308.

The benefits of the present invention will be readily apparent to those skilled in the art. Various embodiments of the invention provide investment strategies, methods, systems, computer-readable media and financial products for establishing arrangements for hedging investment portfolios. In various aspects, the invention provides a replacement source for yield derived from cash and fixed income balances on investments, as well as principal protection and appreciation linked to the performance of a separately managed portfolio or account. In many aspects, the invention may reduce or eliminate basis risk typically associated with traditional hedging transactions that are based on all of the investment names in a portfolio. In addition, various aspects of the invention may provide investors with the potential benefits of active portfolio management versus passive portfolio management, in exchange for at least a portion of the upside returns on the portfolio.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example and without limitation, memory devices such as diskettes, compact discs of both read-only and writeable varieties, digital versatile discs (DVD), optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

As used herein, a "computer" or "computer system" may be, for example and without limitation, either alone or in combination, a personal computer (PC), server-based computer, main frame, microcomputer, minicomputer, laptop, personal data assistant (PDA), cellular phone, pager, processor, including wireless and/or wireline varieties thereof, and/or any other computerized device capable of configuration for processing data for either standalone application or over a networked medium or media. Computers and computer systems disclosed herein can include memory for storing certain software applications used in obtaining, processing, storing and/or communicating data such as investment related data. It can be appreciated that such memory can be internal or external, remote or local, with respect to its operatively associated computer or computer system. The memory can also include any means for storing software, including a hard disk, an optical disk, floppy disk, ROM (read only memory), RAM (random access memory), PROM (programmable ROM), EEPROM (extended erasable PROM), and other suitable computer-readable media.

It is to be understood that the figures and descriptions of embodiments of the present invention have been simplified to illustrate elements that are relevant for a clear understanding of the present invention, while eliminating, for purposes of clarity, other elements. Those of ordinary skill in the art will recognize, however, that these and other elements may be desirable for practice of various aspects of the present embodiments. However, because such elements are well known in the art, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention.

Examples presented herein, including operational examples, are intended to illustrate potential implementations of the various embodiments of the invention. It can be appreciated that such examples are intended primarily for purposes of illustration. No particular aspect or aspects of these examples are intended to limit the scope of the invention.

The figures presented herein are intended for illustrative purposes and are not intended as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts/elements/steps/functions may be made within the principle and scope of the invention without departing from the invention as described in the appended claims.

What is claimed is:

1. An investment method comprising entering into, by an investor, an arrangement with a derivative counterparty in association with a portfolio having a plurality of investments managed by a management entity;

receiving market data with a computer system;

processing the market data with the computer system to set at least one value for said portfolio including at least a minimum protection value for said portfolio;

determining one or more interim settlement periods with a transaction computer system, wherein said one or more interim settlement periods for said portfolio are based on a maturity date of said arrangement between said investor and said derivative counterparty;

processing said market data by said computer system to set a cap level for said portfolio based on at least said minimum protection value of said portfolio, wherein said investor is not entitled to performance of said portfolio above said cap level, wherein the derivative counterparty is entitled to performance of said portfolio above said cap level, wherein said investor is entitled to a minimum value that is greater than a market value of said portfolio when a value of said portfolio is less than said minimum protection value upon the maturity date; and, resetting at least one of said values of said portfolio in association with at least one of said interim settlement periods.

2. The investment method of claim 1, further comprising managing said portfolio with a collateral management entity, wherein said portfolio comprises a collateral account.

3. The investment method of claim 1, further comprising using at least one cap level determinant to determine said cap level for said portfolio.

4. The investment method of claim 3, wherein said cap level determinant includes a fixed percentage for determining said cap level.

5. The investment method of claim 1, wherein said interim settlement period is selected from the group consisting of a daily period, a weekly period, a monthly period, a quarterly period, and a yearly period.

6. The investment method of claim 1, wherein said portfolio includes an actively managed portfolio.

7. The investment method of claim 1, wherein said arrangement between said investor and said derivative counterparty includes at least one hedge arrangement.

8. The investment method of claim 7, wherein said hedge arrangement includes at least one derivative arrangement based on at least a portion of said portfolio.

9. The investment method of claim 7, wherein said hedge arrangement includes at least one insurance policy operatively associated with at least a portion of said portfolio.

10. The investment method of claim 1, further comprising setting at least one other characteristic of said portfolio, said other characteristic selected from the group consisting of turnover of investments, dividend reinvestment, single position concentration, and cash concentration.

11. The investment method of claim 1, further comprising setting at least one other characteristic of said portfolio, said other characteristic selected from a group of sector characteristics consisting of maximum sector concentration, minimum sector concentration, and minimum number of sectors held.

12. The investment method of claim 1, further comprising generating at least one risk report for said portfolio, said risk report including information associated with at least one characteristic of said portfolio.

13. The investment method of claim 1, further comprising adjusting at least one of said values of said portfolio in response to performance of said portfolio above said cap level.

14. The investment method of claim 13, further comprising making at least one settlement payment in association with said adjusting of said values.

15. The investment method of claim 1, further comprising adjusting at least one of said values of said portfolio in response to performance of said portfolio below said cap level.

16. The investment method of claim 15, further comprising making at least one settlement payment in association with said adjusting of said values.

17. The investment method of claim 1, further comprising adjusting a start value of said portfolio to said minimum protection value of said portfolio in response to said performance of said portfolio.

18. The investment method of claim 1, further comprising adjusting a start value of said portfolio for a current interim settlement period based on performance of said portfolio in a prior interim settlement period.

19. The investment method of claim 1, further comprising resetting said cap level as a function of:

(i) performance of said portfolio during one of said interim settlement periods; and (ii) a cap level determinant.

20. An investment method, said method comprising:

entering into, by an investor, an arrangement with a derivative counterparty in association with at least one portfolio having a plurality of investments managed by a management entity;

receiving market data with a computer system;

processing the market data with the computer system to set at least one value for said portfolio including at least a minimum protection value for said portfolio;

determining one or more interim settlement periods with a transaction computer system, wherein said one or more interim settlement periods for said portfolio are based on a maturity date of said arrangement between said investor and said derivative counterparty;

processing said market data by said computer system to set a cap level for said portfolio based on at least said minimum protection value of said portfolio, wherein said investor is not entitled to performance of said portfolio above said cap level, wherein the derivative counterparty is entitled to performance of said portfolio above said cap level, wherein said investor is entitled to a minimum value that is greater than a market value of said portfolio when a value of said portfolio is less than said minimum protection value upon the maturity date; and, resetting at least one of said values of said portfolio or said cap level of said portfolio in association with at least one of said interim settlement periods, wherein said interim settlement period is selected from the group consisting of a daily period, a weekly period, a monthly period, a quarterly period, and a yearly period.

21. A method comprising:

entering into, by an investor, a derivative arrangement with a derivative counterparty, the derivative arrangement having a term, wherein said derivative arrangement obligates the derivative counterparty to pay the investor a payment greater than a market value of said portfolio when the value of a portfolio securities decreases below a minimum protection value over the term of the arrangement, wherein the derivative counterparty is entitled to performance of said portfolio above a cap level; and wherein said derivative arrangement comprises at least one hedge arrangement;

managing said portfolio with a management entity;

receiving market data with a computer system;

determining one or more interim settlement periods with a transaction computer system, wherein said one or more interim settlement periods for said portfolio are based on the term of the derivative arrangement between the investor and the derivative counterparty;

resetting at least one of said values of said portfolio in association with at least one of the interim settlement periods;

determining performance of said portfolio by the transaction computer; and adjusting a start value of said portfolio for a current interim settlement period based on said performance of said portfolio in a prior interim settlement period.

22. The method of claim 21, further comprising managing said portfolio with a collateral management entity, wherein said portfolio comprises a collateral account.

23. The method of claim 22, wherein the investor is not entitled to performance of said portfolio to the extent the value of said portfolio appreciates above said cap level.

24. The investment method of claim 23, wherein at least one cap level determinant is used to determine said cap level for said portfolio.

25. The investment method of claim 24, wherein said cap level determinant includes a fixed percentage for determining said cap level.

* * * * *